United States Patent
Bonwick et al.

(10) Patent No.: US 7,873,799 B2
(45) Date of Patent: Jan. 18, 2011

(54) METHOD AND SYSTEM SUPPORTING PER-FILE AND PER-BLOCK REPLICATION

(75) Inventors: Jeffrey S. Bonwick, Los Altos, CA (US); William H. Moore, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 1163 days.

(21) Appl. No.: 11/406,850

(22) Filed: Apr. 19, 2006

(65) Prior Publication Data

US 2007/0106851 A1   May 10, 2007

Related U.S. Application Data

(60) Provisional application No. 60/733,848, filed on Nov. 4, 2005.

(51) Int. Cl.
G06F 12/00 (2006.01)
G06F 13/00 (2006.01)
G06F 13/28 (2006.01)

(52) U.S. Cl. .............................. 711/154; 711/E12.001
(58) Field of Classification Search ........................ None
See application file for complete search history.

(56) References Cited

U.S. PATENT DOCUMENTS

| | | | |
|---|---|---|---|
| 4,144,522 A | 3/1979 | Kageyama et al. | |
| 5,129,085 A | 7/1992 | Yamasaki et al. | |
| 5,155,847 A | 10/1992 | Kirouac et al. | |
| 5,274,803 A | 12/1993 | Dubin et al. | |
| 5,371,885 A | 12/1994 | Letwin | |
| 5,403,639 A | 4/1995 | Belsan et al. | |
| 5,410,667 A | 4/1995 | Belsan et al. | |
| 5,675,802 A | 10/1997 | Allen et al. | |
| 5,819,292 A | 10/1998 | Hitz et al. | |
| 5,875,457 A * | 2/1999 | Shalit | 711/114 |
| 6,012,063 A | 1/2000 | Bodnar | |
| 6,151,665 A * | 11/2000 | Blumenau | 711/162 |
| 6,170,037 B1 * | 1/2001 | Blumenau | 711/114 |
| 6,209,111 B1 | 3/2001 | Kadyk et al. | |
| 6,341,341 B1 | 1/2002 | Grummon et al. | |
| 6,536,033 B1 | 3/2003 | Weerawarana et al. | |

(Continued)

OTHER PUBLICATIONS

Austin, B.; "*A Dynamic Disc Allocation Algorithm Designed to Reduce Fragmentation During File Reloading*"; Information Sciences Laboratory, Corporate Research and Development Center, General Electric Company, 1970; pp. 378-381 (4 pages).

(Continued)

*Primary Examiner*—Matt Kim
*Assistant Examiner*—Matthew R Chrzanowski
(74) *Attorney, Agent, or Firm*—Osha • Liang LLP (57) ABSTRACT

A method for writing data to a storage pool, involving receiving a first write operation to write a first block to the storage pool, determining a first replication type for the first block using a first replication policy associated with the first block, determining a first number of physical blocks required to write the first block to the storage pool using a size of the first block and the first replication type, and writing the first block, in accordance with the first replication policy, to the storage pool by filling in the first number of physical blocks.

19 Claims, 8 Drawing Sheets

U.S. PATENT DOCUMENTS

| | | | |
|---|---|---|---|
| 6,718,435 B2* | 4/2004 | Riedle | 711/114 |
| 6,745,284 B1 | 6/2004 | Lee et al. | |
| 6,745,305 B2 | 6/2004 | McDowell | |
| 6,795,966 B1 | 9/2004 | Lim et al. | |
| 6,820,098 B1 | 11/2004 | Ganesh et al. | |
| 6,829,617 B2 | 12/2004 | Sawdon et al. | |
| 6,854,071 B2* | 2/2005 | King et al. | 714/8 |
| 6,857,001 B2 | 2/2005 | Hitz et al. | |
| 6,892,211 B2 | 5/2005 | Hitz et al. | |
| 7,007,047 B2* | 2/2006 | Zelenka et al. | 707/204 |
| 7,007,196 B2 | 2/2006 | Lee et al. | |
| 7,032,154 B2 | 4/2006 | Kidorf et al. | |
| 7,039,611 B2 | 5/2006 | Devine | |
| 7,039,661 B1 | 5/2006 | Ranade et al. | |
| 7,043,677 B1 | 5/2006 | Li | |
| 7,133,964 B2 | 11/2006 | Rodrigues et al. | |
| 7,146,522 B1* | 12/2006 | Rowe et al. | 714/6 |
| 7,162,486 B2 | 1/2007 | Patel et al. | |
| 7,174,352 B2 | 2/2007 | Kleiman et al. | |
| 7,200,715 B2 | 4/2007 | Kleiman et al. | |
| 7,293,133 B1* | 11/2007 | Colgrove et al. | 711/111 |
| 7,340,640 B1 | 3/2008 | Karr et al. | |
| 7,424,497 B1* | 9/2008 | Leverett et al. | 707/204 |
| 7,424,637 B1* | 9/2008 | Schoenthal et al. | 714/6 |
| 7,516,355 B2* | 4/2009 | Noya et al. | 714/6 |
| 7,558,927 B2* | 7/2009 | Clark et al. | 711/162 |
| 7,567,991 B2* | 7/2009 | Armangau et al. | 707/203 |
| 7,574,459 B2* | 8/2009 | Sen et al. | 707/204 |
| 7,577,689 B1* | 8/2009 | Masinter et al. | 707/204 |
| 7,610,465 B2* | 10/2009 | Hu et al. | 711/165 |
| 2001/0056438 A1* | 12/2001 | Ito | 707/204 |
| 2002/0004883 A1 | 1/2002 | Nguyen et al. | |
| 2002/0055942 A1 | 5/2002 | Reynolds | |
| 2002/0087788 A1 | 7/2002 | Morris | |
| 2002/0161972 A1 | 10/2002 | Talagala et al. | |
| 2002/0169996 A1* | 11/2002 | King et al. | 714/8 |
| 2003/0033477 A1 | 2/2003 | Johnson et al. | |
| 2003/0084242 A1 | 5/2003 | Strange et al. | |
| 2003/0101320 A1* | 5/2003 | Chauvel et al. | 711/154 |
| 2003/0126107 A1 | 7/2003 | Yamagami | |
| 2003/0145167 A1 | 7/2003 | Tomita | |
| 2003/0187883 A1* | 10/2003 | Zelenka et al. | 707/201 |
| 2003/0188097 A1* | 10/2003 | Holland et al. | 711/114 |
| 2004/0024973 A1 | 2/2004 | Chron et al. | |
| 2004/0030822 A1* | 2/2004 | Rajan et al. | 711/4 |
| 2004/0064474 A1* | 4/2004 | Hitz et al. | 707/102 |
| 2004/0098720 A1 | 5/2004 | Hooper | |
| 2004/0107314 A1 | 6/2004 | Kim et al. | |
| 2004/0123063 A1 | 6/2004 | Dalal et al. | |
| 2004/0143713 A1 | 7/2004 | Niles et al. | |
| 2004/0153479 A1* | 8/2004 | Mikesell et al. | 707/200 |
| 2004/0225834 A1 | 11/2004 | Lu et al. | |
| 2004/0234000 A1 | 11/2004 | Page | |
| 2004/0268068 A1 | 12/2004 | Curran et al. | |
| 2005/0010620 A1 | 1/2005 | Silvers et al. | |
| 2005/0021916 A1* | 1/2005 | Loafman | 711/154 |
| 2005/0097270 A1 | 5/2005 | Kleiman et al. | |
| 2005/0132212 A1* | 6/2005 | Haswell | 713/193 |
| 2005/0210083 A1* | 9/2005 | Kodama | 707/205 |
| 2005/0235154 A1 | 10/2005 | Serret-Avila | |
| 2005/0246397 A1* | 11/2005 | Edwards et al. | 707/204 |
| 2005/0268056 A1* | 12/2005 | Meiri et al. | 711/162 |
| 2006/0010293 A1* | 1/2006 | Schnapp et al. | 711/119 |
| 2006/0036898 A1* | 2/2006 | Doering | 714/5 |
| 2006/0059306 A1* | 3/2006 | Tseng | 711/114 |
| 2006/0136685 A1* | 6/2006 | Griv et al. | 711/162 |
| 2006/0168409 A1 | 7/2006 | Kahn et al. | |
| 2006/0218644 A1 | 9/2006 | Niles et al. | |
| 2006/0224550 A1* | 10/2006 | Gopisetty et al. | 707/1 |
| 2006/0256965 A1 | 11/2006 | Rowe | |
| 2007/0094269 A1* | 4/2007 | Mikesell et al. | 707/10 |
| 2007/0198789 A1* | 8/2007 | Clark et al. | 711/162 |

OTHER PUBLICATIONS

Goodheart, B. et al.; "*The Magic Garden Explained*"; Prentice Hall, 1994; pp. 24-25, 29-30, 390-391 (8 pages).

Stallings, W.; "*Computer Organization and Architecture: Designing for Performance*"; Prentice Hall, Fifth Edition, 2000; pp. 377-378 (4 pages).

Johnson, J. E. et al.; "Overview of the Spiralog File System", Digital Technical Journal, vol. 8, No. 2, 1996, pp. 5-14 (10 pages).

Santry, D. S. et al.; "Deciding When to Forget in the Elephant File System"; 17th ACM Symposium on Operating Systems Principles (SOSP '99), Dec. 1999; pp. 110-123 (14 pages).

Chutani, S. et al., "The Episode File System", Proceedings of the 1992 USENIX Winter Technical Conference; 1992; (18 pages).

Seltzer, M. L.; "File System Performance and Transaction Support"; University of California at Berkeley, 1992 (131 pages).

Octavian Lascu et al, "Configuration and Tunin GPFS for Digital Media Environments", Nov. 2005, IBM International Technical Support Organization, p. 38. Available online: http://www.redbooks.ibm.com/redbooks/pdfs/sg246700.pdf.

"An Introduction to GPFS v1.3 for Linux", Jun. 2003. Available online: http://jumpdoc.fz-juelich.de/doc_pdf/gpfs21/GPFs-Linux-wp060303.pdf.

Sanjay Ghemawat et al, "The Google File System", ACM, p. 3.

Sandberg, R. et al.; "Design and Implementation of the Sun Network Filesystem"; Sun Microsystems, Inc., 1985 USENIX Conference (12 pages).

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"VERITAS File System 3.4 Administrator's Guide" VERITAS Software Corporation, Nov. 2000, http://www.veritas.com; pp. 1-227 (227 pages).

Czezatke C. et al.; "Linlogfs: A Log-Structured Filesystem for Linux"; The USENIX Association, Proceedings of FREENIX Track: 2000 USENIX Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached WORM File System"; AT&T Bell Laboratories, Murry Hill, New Jersey; Software-Practice and Experience, vol. 21(12), pp. 1289-1299, Dec. 1991 (11 pages).

Sun StorEdge Instant Image 2.0 System Administrator's Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berücksichtigung der technischen Parameter optischer Speichermedien und multimedialer Anwendungen"; Diplomarbeir Jorg Schilling, eingereicht am 23.05. 1991 an der TU Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espoo, Finland, 1993 (22 pages).

"The Enterprise Challenge Served by Snapshot"; Whitepaper, 2001 LSI Logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore—560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, Univeristy of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Integrity in a Large Segmented Database"; ACM Transactions on Database Systems, vol. 2, No. 1, Mar. 1977, pp. 91-104 (14 pages).

* cited by examiner

METHOD AND SYSTEM SUPPORTING PER-FILE AND PER-BLOCK REPLICATION

CROSS REFERENCE TO RELATED APPLICATIONS

This application claims benefit of U.S. Provisional Application Ser. No. 60/733,848 filed on Nov. 4, 2005, entitled "MULTIPLE REPLICATION LEVELS WITH POOLED DEVICES" in the names of William H. Moore, Jeffrey S. Bonwick, and Matthew A. Ahrens.

The present application contains subject matter that may be related to the subject matter in the following U.S. patent applications, which are all assigned to a common assignee: "Method and Apparatus for Self-Validating Checksums in a File System" (application Ser. No. 10/828,573) filed on Apr. 24, 2004; "Method and Apparatus for Dynamic Striping" (application Ser. No. 10/828,677) filed on Apr. 21, 2004; "Method and Apparatus for Vectored Block-Level Checksum for File System Data Integrity" (application Ser. No. 10/828,715) filed on Apr. 21, 2004; "Method and Apparatus for Identifying Tampering of Data in a File System" (application Ser. No. 10/853,874) filed on May 26, 2004; "Method and System for Detecting and Correcting Data Errors Using Checksums and Replication" (application Ser. No. 10/853,837) filed on May 26, 2004; "Method and System for Detecting and Correcting Data Errors Using Data Permutations" (application Ser. No. 10/853,870) filed on May 26, 2004; "Method and Apparatus for Compressing Data in a File System" (application Ser. No. 10/853,868) filed on May 26, 2004; "Gang Blocks" (application Ser. No. 10/919,878) filed on Aug. 17, 2004; "Method and Apparatus for Enabling Adaptive Endianness" (application Ser. No. 10/919,886) filed on Aug. 17, 2004; "Automatic Conversion of All-Zero Data Storage Blocks into File Holes" (application Ser. No. 10/853,915) filed on May 26, 2004; "Multiple Replication Levels with Pooled Devices" (Application Ser. No. 60/733,848) filed on Nov. 4, 2005; "Method and System for Data Replication" filed on May 15, 2006; Multiple Replication Levels with Pooled Devices" filed on Apr. 19, 2006; "Double-Wide Block Pointers" filed on Apr. 19, 2006; and "Method and System for Adaptive Metadata Replication" filed on Apr. 19, 2006.

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

An application, which may reside on the local system (i.e., computer) or may be located on a remote system, uses files as an abstraction to address data. Conventionally, this data is stored on a storage device, such as a disk.

Data stored as files in a file system may be replicated using one or more replication schemes. Replication schemes are typically used to enable recover data in the event of file system failures, data corruption, etc. Data replication ensures continuous availability and protection of data stored on disk. The follow is a non-exclusive list of common replication schemes: redundant arrays of independent disks (RAID) schemes, 2-way mirroring, 3-way mirroring, etc.

SUMMARY

In general, in one aspect, the invention relates to a method for writing data to a storage pool, comprising receiving a first write operation to write a first block to the storage pool, determining a first replication type for the first block using a first replication policy associated with the first block, determining a first number of physical blocks required to write the first block to the storage pool using a size of the first block and the first replication type, and writing the first block, in accordance with the first replication policy, to the storage pool by filling in the first number of physical blocks.

In general, in one aspect, the invention relates to a system for writing data, comprising a storage pool comprising a plurality of child blocks, wherein each of the plurality of child blocks comprises one selected from the group consisting of a data block and an indirect block, wherein the indirect block references at least one of the plurality of child blocks, a parent block referencing at least one child block, and a file system configured to write a first block to the storage pool, wherein the first block is one selected from the group consisting of the parent block and one of the plurality of child blocks, wherein the file system writes the first block to the storage pool using the following method steps determining a first replication type for the first block using a first replication policy associated with the first block, determining a first number of physical blocks required to write the first block to the storage pool using a size of the first block and the first replication type, and writing the first block, in accordance with the first replication policy, to the storage pool by filling in the first number of physical blocks.

In general, in one aspect, the invention relates to a computer usable medium comprising computer readable program code embodied therein for causing a computer system to determine a first replication type for the first block using a first replication policy associated with the first block, determine a first number of physical blocks required to write the first block to the storage pool using a size of the first block and the first replication type, and write the first block, in accordance with the first replication policy, to the storage pool by filling in the first number of physical blocks.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of one or more embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to data replication. More specifically, embodiments of the invention relate to enabling a file system to support per-file and per-block replication. Said another way, embodiments of the invention are directed to file system that allows for the granularity of the replication type to be specified on a per-block basis, a per-file basis or a per-file system basis.

Figure 1:
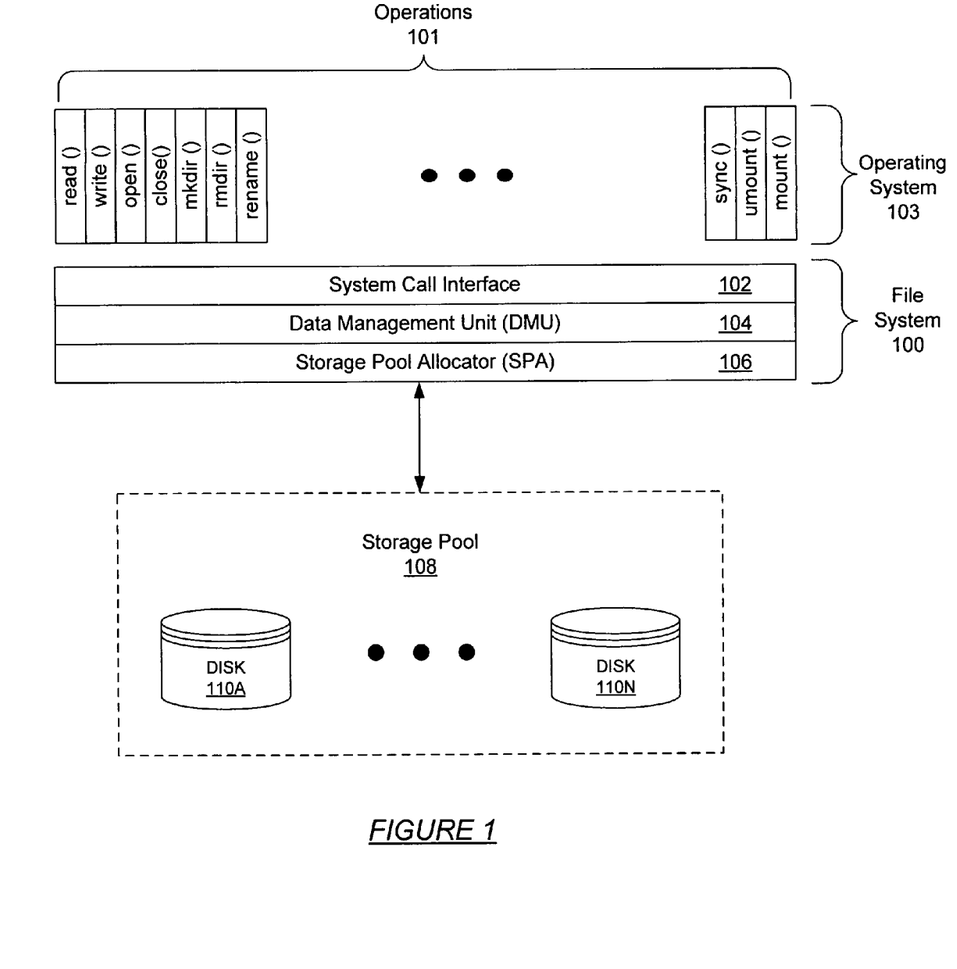
FIG. 1 shows a system architecture in accordance with an embodiment of the invention.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

More specifically, in one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). More specifically, the DMU (104) represents the objects as data blocks and indirect blocks as described in FIG. 3 below. Additionally, in one embodiment of the invention, the DMU (104) includes functionality to group related work (i.e., modifications to data blocks and indirect blocks) into I/O requests (referred to as a "transaction group") allowing related blocks to be forwarded to the SPA (106) together. The SPA (106) receives the transaction group from the DMU (104) and subsequently writes the blocks into the storage pool (108). The operation of the SPA (106) is described in FIG. 2 below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
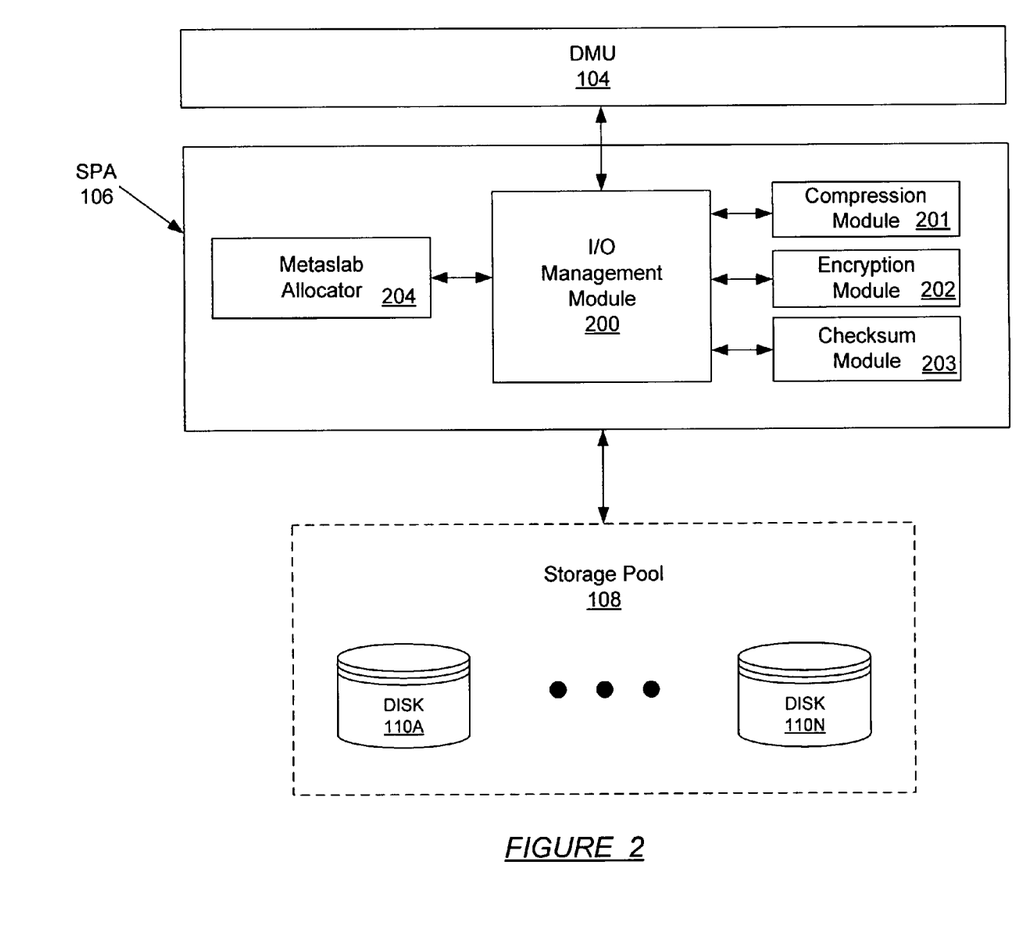
FIG. 2 shows a storage pool allocator in accordance with an embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these aforementioned modules are described in detail below.

As noted above, the SPA (106) receives transactions from the DMU (104). More specifically, the I/O management module (200), within the SPA (106), receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). More specifically, in one embodiment of the invention, the SPA (106) uses the metaslab allocator (204) to manage the allocation of storage space in the storage pool (108).

In one embodiment of the invention, the storage space in the storage pool (108) is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator (204) may include a policy that specifies a method to allocate segments.

Figure 3:
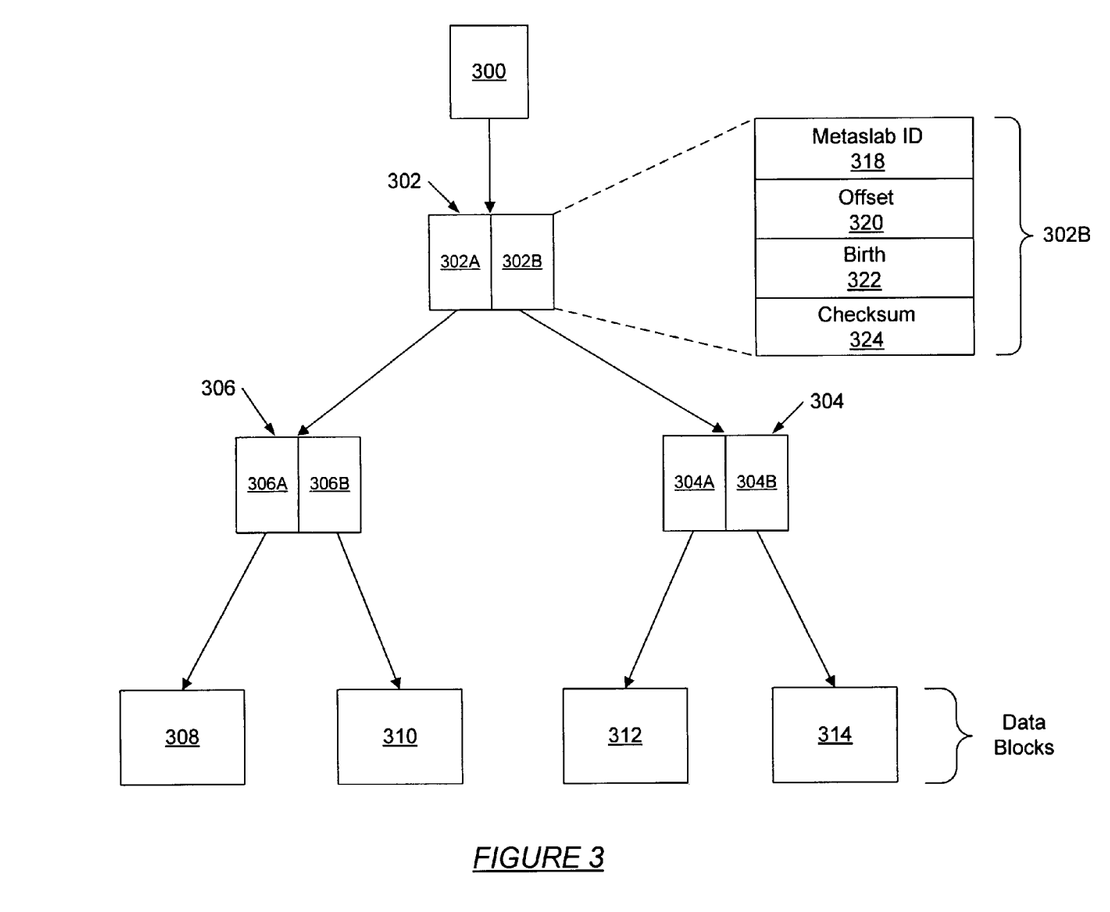
FIG. 3 shows a hierarchical data configuration in accordance with an embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306). In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather data blocks contain actual data of files within the file system.

In one embodiment of the invention, each block pointer includes a metaslab ID (318), an offset (320) within the metaslab, a birth value (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data block and indirect block is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending an I/O request to the SPA. The indirect blocks containing the block pointers are typically written one level at a time. To complete the copy-on-write transaction, the SPA issues a single write that atomically changes the root block to reference the indirect blocks referencing the modified data block.

Figure 4:
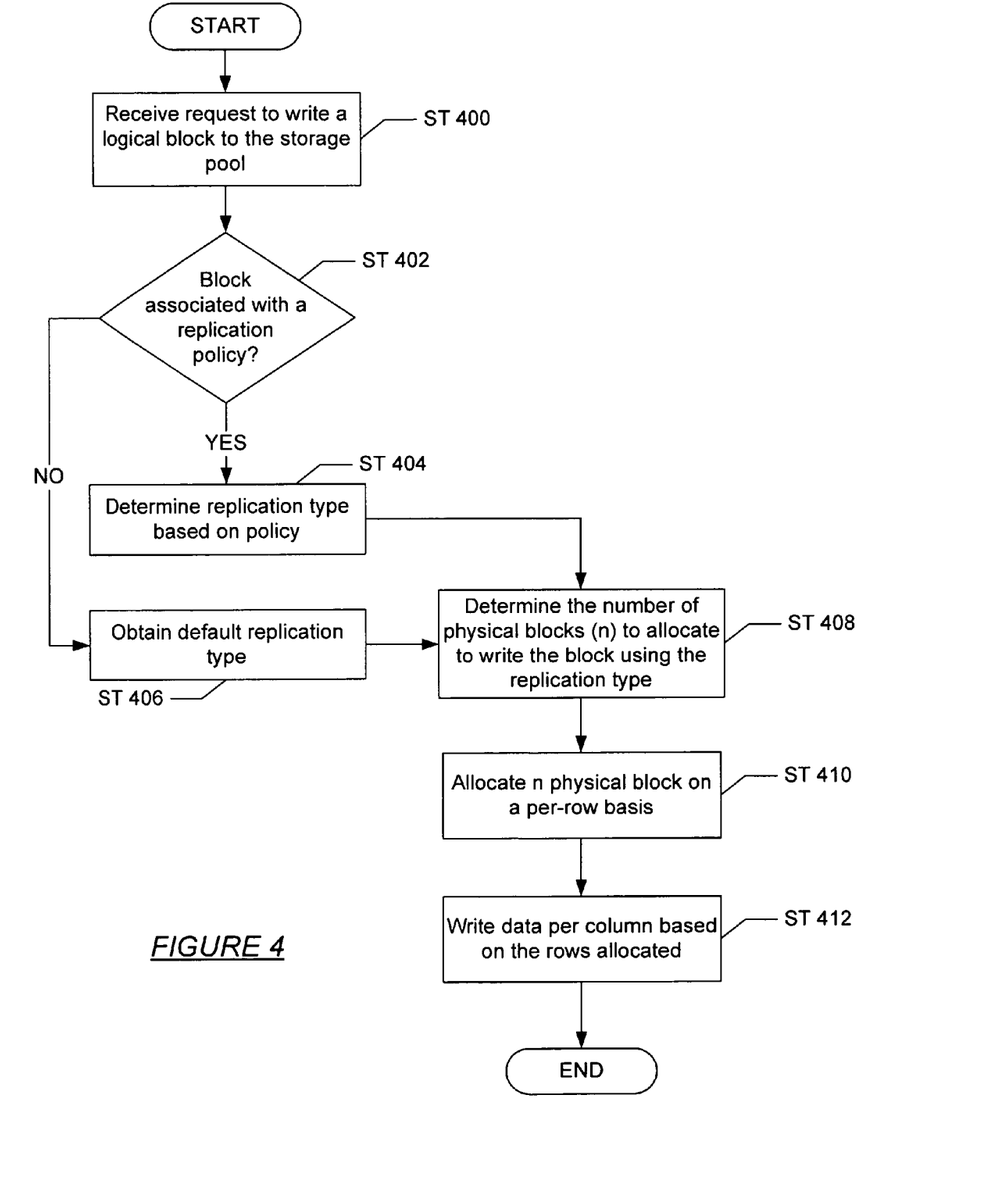
FIGS. 4-5 show flow charts in accordance with an embodiment of the invention.

Using the infrastructure shown in FIGS. 1-3, the following discussion describes a method for allocating blocks on disk and writing data (i.e., data blocks) and metadata (i.e., indirect blocks) based on one or more replication schemes. FIG. 4 shows a flow chart for writing a logical block (e.g., a data block or a block containing, among other information, metadata) to the storage pool in accordance with one embodiment of the invention. Those skilled in the art will appreciate that the logical block is typically larger than the physical blocks. Initially, a request to write the logical block to the storage pool is received (Step 400). A determination is then made about whether the logical block is associated with a replication policy (Step 402). For example, the logical block may be associated with a block level replication policy, a file level replication policy, or a file system level replication policy.

In one embodiment of the invention, the block level policy corresponds to a replication policy with a granularity of a block. Thus, the policy specifies how a block is to be replicated. In one embodiment of the invention, a file level policy corresponds to a replication policy with a granularity of a file. Thus, all blocks that are associated with a given file are replicated in accordance with the file's replication policy. In one embodiment of the invention, the file system policy corresponds to a replication policy with a granularity of a file system. Thus, all files within the file system are replicated in accordance with the file system's policy.

Continuing with the discussion of FIG. 4, if the block is associated with a replication policy, then the replication type (e.g., mirroring, RAID, etc.) is obtained from the replication policy (Step 404). Alternatively, if a replication policy for the logical block does not exist, then a default replication type is determined (Step 406). Once the replication type is determined (using Step 404 or Step 406), the process proceeds to Step 408.

At Step 408, the number of physical blocks that need to be allocated in the storage pool is determined using, among other information, the replication type (Step 408). The steps involved in determining the number of physical blocks to allocated on disk is discussed below in FIG. 5. Once the number of physical blocks to allocate the number of physical blocks is allocated in the storage pool on a per-row basis (Step 410).

For example, if there are five disks in the storage pool and eight physical blocks need to be allocated, then two rows are required. The first row includes five of the eight physical blocks and the second row includes the remaining three physical blocks. In one embodiment of the invention, the logical block (or more specifically the data in the logical block) is written into the allocated physical blocks column-first (Step 412). That is, although physical blocks are allocated using rows, the rows are filled in on a per-column basis when the logical block is written to disk. Using the eight block example from above, physical blocks in the first three columns are written to prior to writing to the remaining physical blocks in columns 4 and 5.

Figure 5:
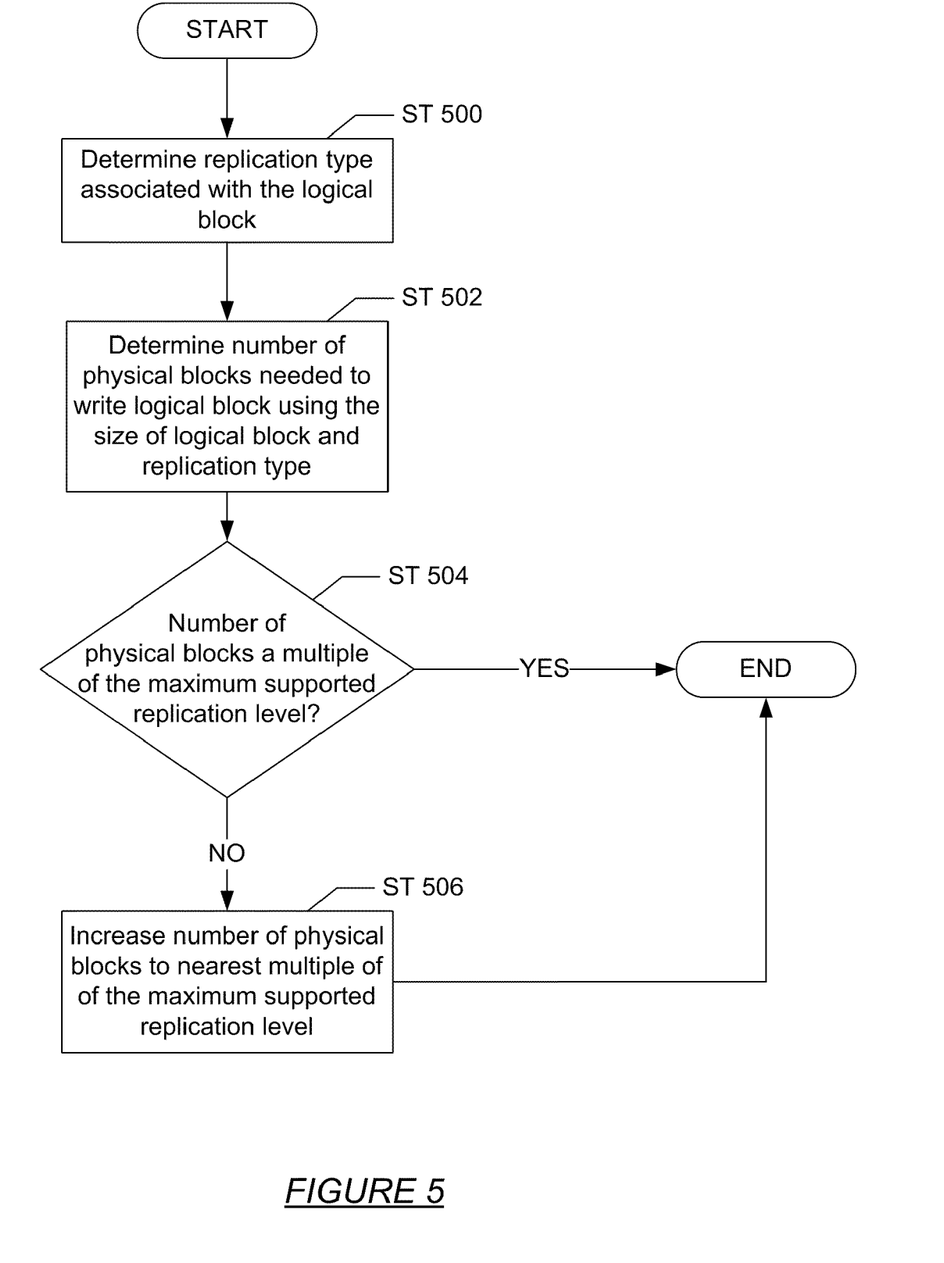

FIG. 5 shows a flow chart showing a method for allocating blocks on disk in accordance with one embodiment of the invention. Specifically, FIG. 5 describes the method corresponding to Step 408 of FIG. 4 in accordance with one embodiment of the invention. Initially, the replication type for the logical block is determined using the replication policy (Step 500). Subsequently, the number of blocks needed to write the logical data to disk is computed using the size of the logical block and the replication type (Step 502). In one embodiment of the invention, the size of logical data corresponds to the number of physical blocks required to write the logical block to disk. In one embodiment of the invention, a single logical block may correspond to more than one physical block (e.g., data block (314) in FIG. 3 may correspond to 1K of data, in which case the single logical block (314) is actually two physical blocks on disk assuming that each individual physical block is 512 bytes).

In one embodiment of the invention, the number of blocks to allocate is computed as a function of the physical size of the data and the replication type used to write the logical block to disk. For example, if the logical block is to be written to disk using a RAID scheme, then the number of physical blocks to allocate is determined by summing the number of physical blocks required to write the logical block into the storage pool and an appropriate number of parity blocks (i.e., physical blocks used to store parity data associated with one or more of the physical blocks). Alternatively, if the size of the logical block is 2K and the replication type is three-way mirroring, then twelve physical blocks would be allocated in the storage pool. Those skilled in the art will appreciate that some logical blocks in the storage pool may not be replicated, in which case physical blocks allocated on disk would correspond directly to the size of the logical block.

At this stage, the number of physical blocks that need to be allocated has been determined, however, the number of physical blocks that need to be allocated may need to be increased to prevent (or mitigate) fragmentation in file system. To determine if the number of physical blocks that need to be allocated is sufficient, a determination is made about whether the number of physical blocks determined in Step 502 is a multiple of the maximum supported replication level. (Step 504). If the number of physical blocks determined in Step 502 is a multiple of the maximum supported replication level, then the process ends. However, if the number of physical blocks determined in Step 502 is not a multiple of the maximum supported replication level, then the number of physical blocks determined in Step 502 is increased until the number of physical blocks is a multiple of the maximum supported replication level. In one embodiment of the invention, the additional physical blocks added in Step 506 correspond to padded physical blocks (e.g., blocks that contain all zeros).

In one embodiment of the invention, the maximum supported replication level is determined when the file system is initially configured (or soon thereafter). Further, in one embodiment of the invention, the default maximum supported replication level is 2-way mirroring. Thus, the number of physical blocks determined in Step 502 (or after Step 506) must be a multiple of 2. However, if the maximum supported replication level is greater than 2-way mirroring, for example, 3-way mirroring, then the number of physical blocks determined in Step 502 (or after Step 506) must be a multiple of 3. Those skilled in the art will appreciate that any replication type may be used and that the aforementioned examples of maximum supported replication level are not intended to limit the scope of the invention.

Figure 6:
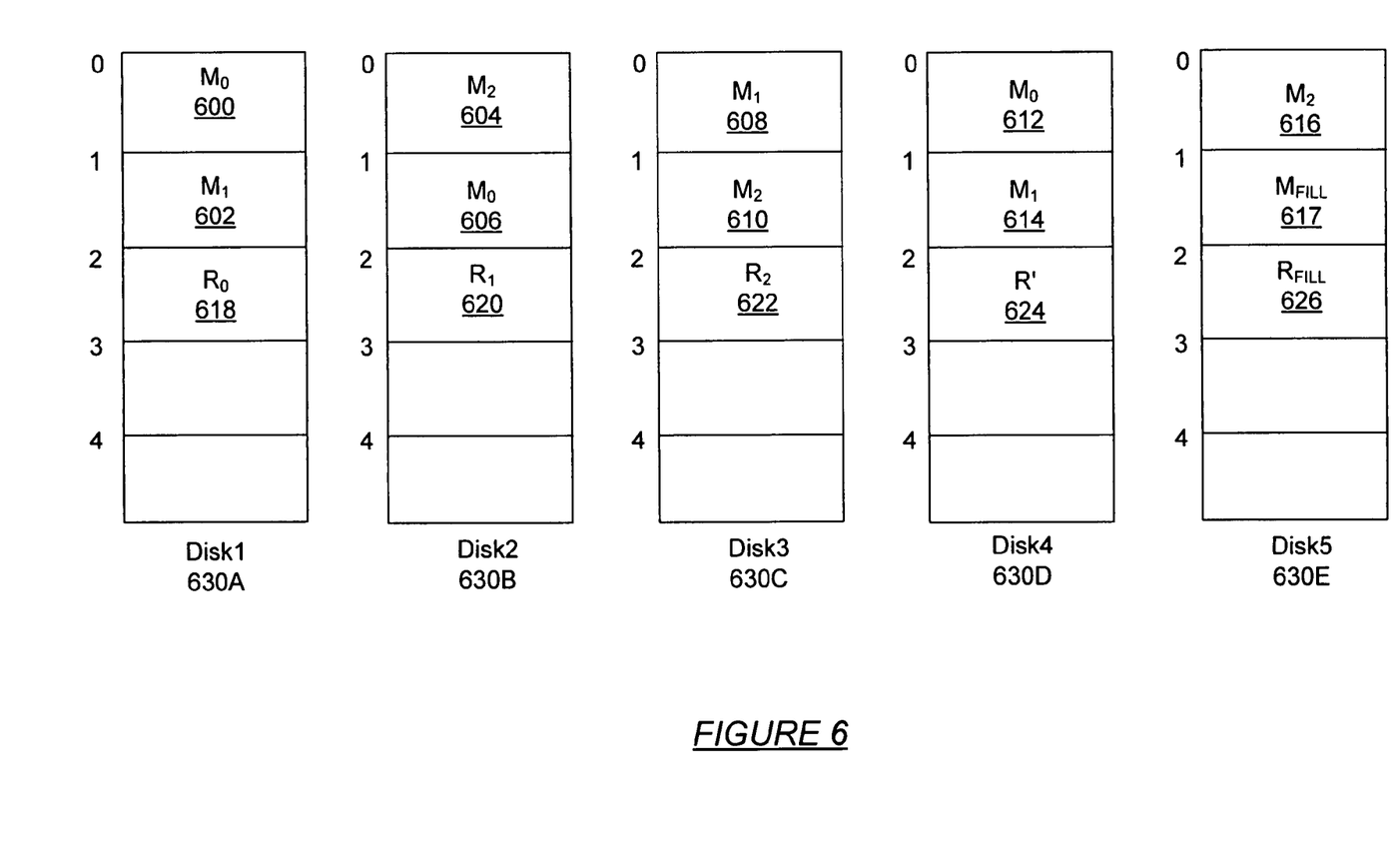
FIG. 6 shows an example of replication of data in accordance with an embodiment of the invention.

FIG. 6 shows an example of using multiple replication types to write logical blocks to the storage pool in accordance with one embodiment of the invention. For the purposes of the discussion of FIG. 6 assume that the minimum replication level is 5-way mirroring. The storage pool in FIG. 6 includes five disks (i.e., Disk 1 (630A), Disk 2 (630B), Disk 3 (630C), Disk 4 (630D), Disk 5 (630E)). In the example shown in FIG. 6, a logical block (represented by $M_0$ (600), $M_1$ (602), $M_2$ (604)) of size 1.5K is replicated using three-way mirroring. Thus, 4.5K (or nine physical blocks) (i.e., $M_0$ (600), $M_1$ (602), $M_2$ (604), $M_0$ (606), $M_1$ (608), $M_2$ (610), $M_0$ (612), $M_1$ (614), $M_2$ (616)) are allocated to write the logical block to the storage pool. As described above, because the number of physical blocks allocated to store 1.5K is nine, the number of physical blocks is increased to 10 (i.e., a multiple of the maximum replication level).

Further, in one embodiment of the invention, the ten blocks are allocated by row across each disk, and filled in column-first, as indicated by the order of the three-way mirrored data. That is, $M_0$ (600), $M_1$ (602), $M_2$ (604), $M_0$ (606), $M_1$ (608), $M_2$ (610), $M_0$ (612), $M_1$ (614), $M_2$ (616), and $M_{FILL}$ (617) are filled in by column on each disk starting with Disk 1 (630A) rather than writing the data across an entire row before proceeding to the next row.

Continuing with FIG. 6, the next logical block written to disk is 1.5K and is written to the storage pool using a RAID scheme. In accordance with the RAID scheme, one parity block is required (i.e., R' (624)). Accordingly, four blocks (i.e., three data blocks ($R_0$ (618), $R_1$ (620), and $R_2$ (622)) and one parity block R' (624)) are required to write the logical block to the storage pool using the RAID scheme. However, because the maximum supported replication level is 5-way mirroring, an additional fill block ($R_{FILL}$ (626)) required to be stored with the four aforementioned physical blocks.

FIG. 6 shows how multiple files may be stored on disk using different replication types. In one embodiment of the invention, the replication type of each block stored on disk is specified in the block pointer referencing that block. Thus, the exact location of a data block or an indirect block and how the data is replicated can be obtained from the block pointer of each block written to disk. Those skilled in the art will appreciate that although the example shown in FIG. 6 shows three-way mirrored data and RAID replicated data, there may be other replication types used to write data to disk (e.g., two-way mirroring, etc.).

Figure 7:
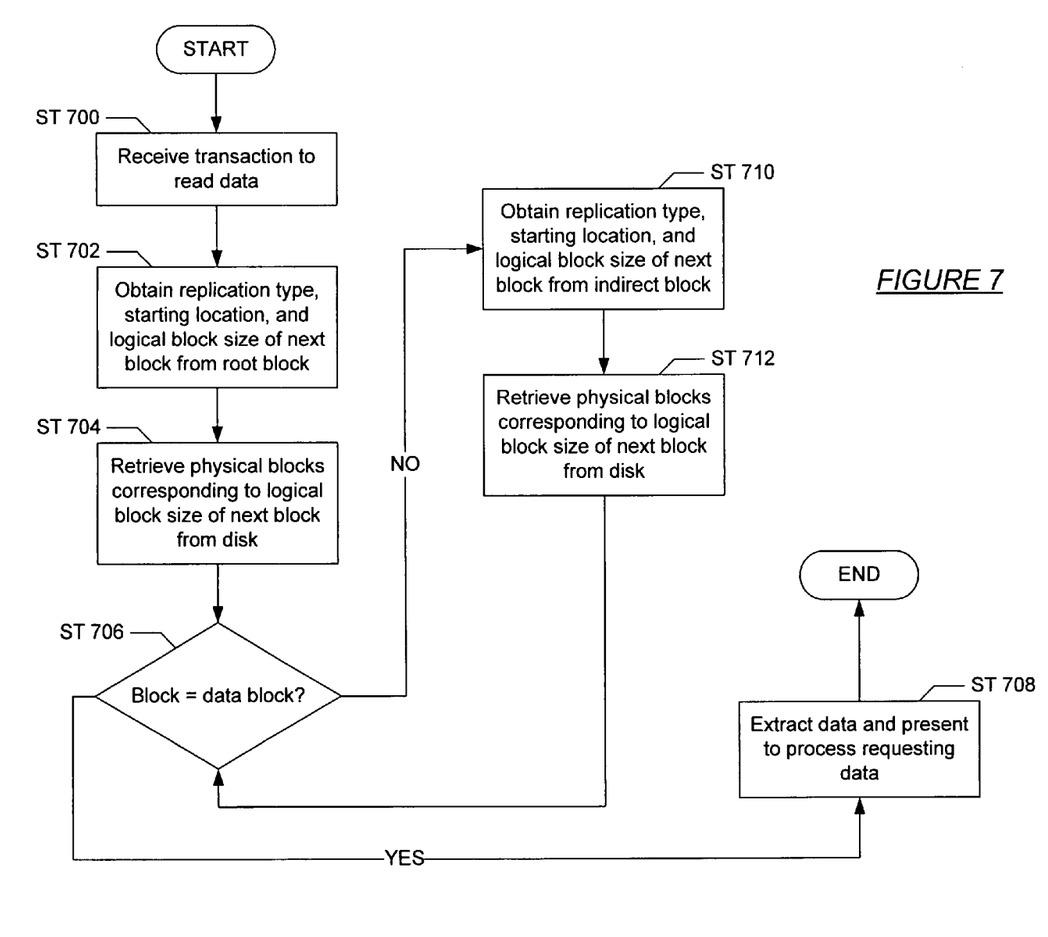
FIG. 7 shows a flow chart in accordance with an embodiment of the invention.

Although the aforementioned description of the invention has been focused on writing data using various types of replication policies, those skilled in the art will appreciate that the replication type and the number of blocks allocated to write data also affects the manner in which data is read and retrieved from disk. FIG. 7 shows a flow chart for reading data in accordance with one or more embodiments of the invention.

Initially, a transaction to read data is received (Step 700). Subsequently, the replication type, starting location (i.e., the metaslab ID and offset), and the logical block size of the next block is obtained from the root block (Step 702). That is, the block pointer of the root block is obtained and read to determine the location, size, and replication type of the block referenced by the root block. The logical block size stored in the block pointer of a block indicates the actual size of the data corresponding to the next block. In other words, because the logical block size of data may be different than the number of blocks allocated to store the data (e.g., due to a replication type), the logical block size is required to determine where the data stops on disk (i.e., how many blocks actually need to be retrieved beginning with the starting location of the data). Next, the physical blocks corresponding to the next block are retrieved from disk (Step 704). Those skilled in the art will appreciate that not all of the physical blocks associated with the next block need to be retrieved if the next block was stored using a replication scheme. In such cases, only a subset of all physical blocks corresponding to the next block need to be retrieved.

Further, those skilled in the art will appreciate that if the logical block is compressed, then the block pointer referencing the next block will also include a physical size field. The physical size field corresponds to the actual size of the data stored in storage pool. For example, if the next block is a 4K block and is compressed to a 1K block and stored using 2-way mirroring, then the following information is stored in the block pointer referencing the next block: (i) logical size=4K; (ii) physical size=1K; (iii) allocated size=2K; and (iv) replication type=2-way mirroring. From the example, those skilled in the art will appreciate that physical size addresses compression while allocated size address replication. Further, those skilled in the art will appreciate that if there is no compression, then the physical size and the logical size are equal.

Continuing with the discussion of FIG. 7, at this stage, a determination is made about whether the data retrieved corresponds to a data block (Step 706). If the data corresponds to a data block, then the data is extracted from the retrieved blocks and presented to the process requesting the data (Step 708). Alternatively, if the data does not correspond to a data block, then the retrieved blocks correspond to an indirect block. In this case, the replication type, starting location, and the logical block size of the next block is obtained from the block pointer in the indirect block (Step 710). Subsequently, the physical blocks corresponding to the logical block size of the next block are retrieved from disk (Step 712). If the retrieved blocks correspond to a data block (Step 706), then the data is extracted and presented to the requesting process (Step 1208). If the retrieved blocks do not correspond to a data block, then Steps 706-712 are repeated until the data block is encountered.

In one embodiment of the invention, if the replication policy (e.g., the block level policy, file level policy, or filesystem policy) is changed on-the-fly, then any new data that is written to disk is written using the new replication policy. Thus, in one embodiment of the invention, because the file system implements copy-on-write, any new data/modified data written to disk may be written using the new replication policy, without affecting old data already written to disk using the previous replication policy. Further, because the replication type for each block is maintained in the block's metadata, the file system may still recover data that was written using a previous replication policy Further, in one embodiment of the invention, if a new replication policy for a given block, file, or file system has been selected, then a background process is initiated to re-write the current data in the system in accordance with the new replication policy. For example, if a given policy for a file is changed from 2-mirroring to RAID, then the background process may obtain the logical blocks (e.g., the data blocks and indirect blocks) corresponding to the file from the storage pool and re-write the logical blocks into a new location(s) in the storage pool using the new replication policy. Those skilled in the art will appreciate that the logical blocks corresponding to the file that were previously stored using 2-way mirroring are not overwritten as the invention, in one embodiment of the invention, uses copy-on write; rather, the logical blocks corresponding to the file that were previously stored using 2-way mirroring are de-allocated.

In one embodiment of the invention, the background process operates in an asynchronous manner. Further, in one embodiment of the invention, a background process is not initiated and the new replication policy is only applied when new blocks are written to the storage pool, where the new blocks correspond to new logical blocks or modified logical blocks.

Figure 8:
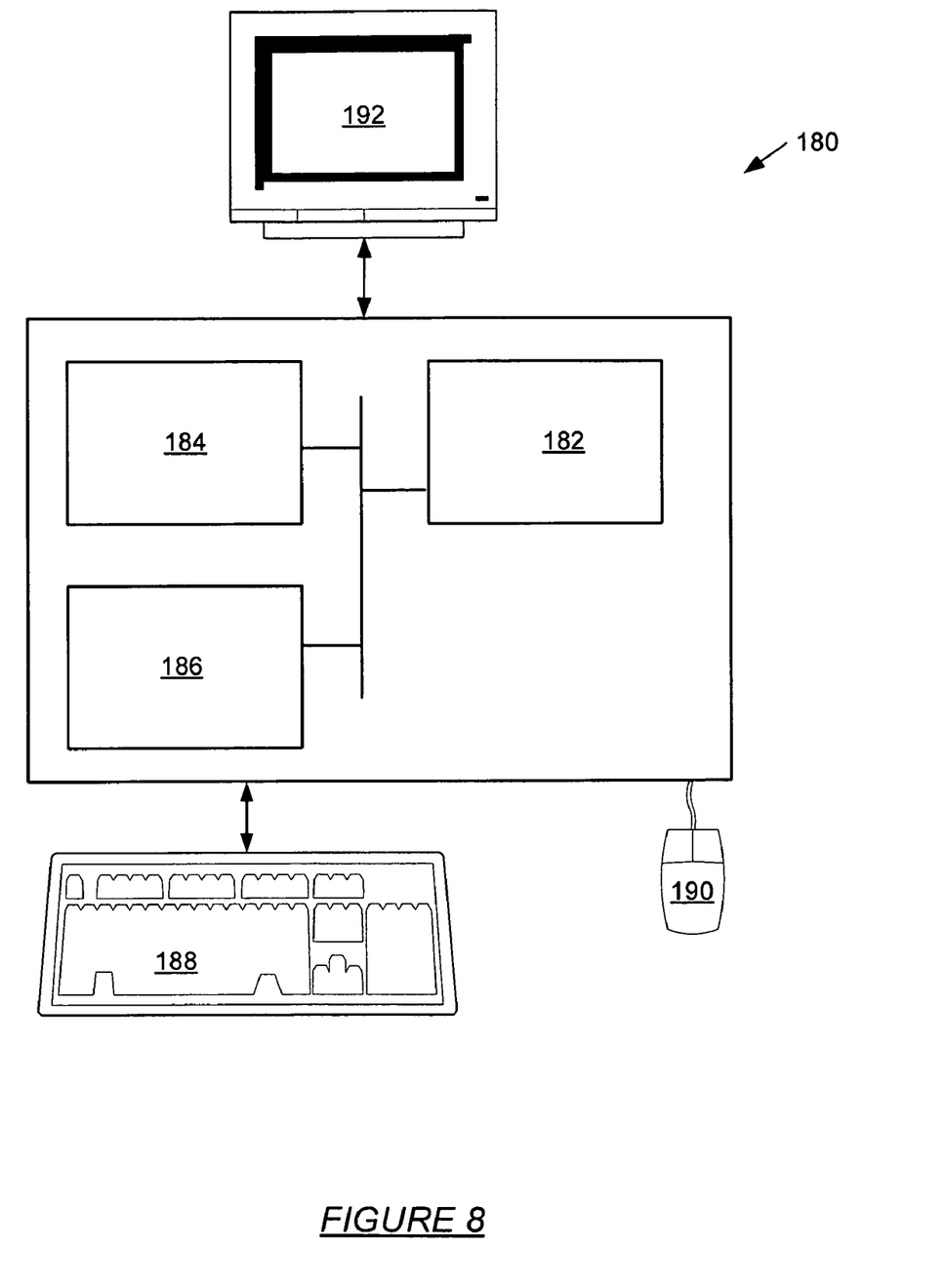
FIG. 8 shows a computer system in accordance with an embodiment of the invention.

The invention may be implemented on virtually any type of computer regardless of the platform being used. For example, as shown in FIG. 8, a networked computer system (180) includes a processor (182), associated memory (184), a storage device (186), and numerous other elements and functionalities typical of today's computers (not shown). The networked computer system (180) may also include input means, such as a keyboard (188) and a mouse (190), and output means, such as a monitor (192). The networked computer system (180) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (180) may be located at a remote location and connected to the other elements over a network. Further, the invention may be implemented on a distributed system having a plurality of nodes, where each portion of the invention (e.g., the storage pool, the SPA, the DMU, etc.) may be located on a different node within the distributed system. In one embodiment of the invention, the node corresponds to a computer system. Alternatively, the node may correspond to a processor with associated physical memory.

Further, software instructions to perform embodiments of the invention may be stored on a computer readable medium such as a compact disc (CD), a diskette, a tape, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for writing data to a storage pool, comprising:
   receiving a first write operation to write a first data block to the storage pool, wherein the storage pool is organized in a hierarchical tree structure comprising data blocks and indirect blocks located hierarchically above the data blocks;
   determining a first replication type for the first data block using a first replication policy associated with the first data block;
   determining a first number of physical blocks required to write the first data block to the storage pool using a size of the first data block and the first replication type;
   writing the first data block, in accordance with the first replication policy, to the storage pool by filling in the first number of physical blocks,
       wherein the first replication type for the first data block is stored in a block pointer of a first indirect block referencing the first data block in the hierarchical tree structure;
   receiving a second write operation to write the first indirect block;
   determining a second replication type for the first indirect block using the first replication policy associated with the indirect block;
   determining a second number of physical blocks required to write the first indirect block using a size of the first indirect block and the second replication type;
   writing the first indirect block, in accordance with the first replication policy by filling in the second number of physical blocks in the storage pool,
       wherein the second replication type and the size for the first indirect block is stored in a block pointer of a second indirect block referencing the first indirect block.

2. The method of claim 1, further comprising:
   modifying the first replication policy associated with the first block to obtain a second replication policy, wherein the second replication policy specifies a third replication type.

3. The method of claim 2, further comprising:
   receiving a third write operation to write a modified version of the first data block to the storage pool;

determining the third replication type for the modified version of first data block using the second replication policy associated with the first data block;

determining a third number of physical blocks required to write the modified version of the first data block to the storage pool using a size of the modified version of the first data block and the third replication type; and writing the modified version of the first data block, in accordance with the second replication policy, to the storage pool by filling in the third number of physical blocks.

4. The method of claim 2, further comprising:

initiating a background process in response to modifying the first replication policy, wherein the background process is configured to:
obtain the first data block from the storage pool, and
re-write the first data block to the storage pool using the second replication policy.

5. The method of claim 1, wherein the first replication policy corresponds to one selected from the group consisting of: a block level replication policy, a file level replication policy, and a file system replication policy.

6. A system for writing data, comprising:

a storage pool comprising:
a plurality of child blocks, wherein each of the plurality of child blocks comprises one selected from the group consisting of a data block and an indirect block, wherein each of the indirect blocks reference at least one of the plurality of child blocks and is hierarchically above the at least one of the plurality of child blocks referenced by each indirect block;
a parent block referencing at least one child block that is hierarchically above the at least one child block; and a file system configured to:
write a first block to the storage pool, wherein the first block is one of the plurality of child blocks, wherein the file system writes the first block to the storage pool using the following method steps:
determining a first replication type for the first block using a first replication policy associated with the first block,
determining a first number of physical blocks required to write the first block to the storage pool using a size of the first block and the first replication type,
writing the first block, in accordance with the first replication policy, to the storage pool by filling in the first number of physical blocks, wherein the first replication type for the first data block is stored in a block pointer of a first indirect block referencing the first block; and
write the first indirect block to the storage pool by:
determining a second replication type for the first indirect block using the first replication policy associated with the first indirect block,
determining a second number of physical blocks required to write the first indirect block using a size of the first indirect block and the second replication type,
writing the first indirect block, in accordance with the first replication policy by filling in the second number of physical blocks in the storage pool,
wherein the second replication type and the size for the first indirect block is stored in a block pointer of a second indirect block referencing the first indirect block.

7. The system of claim 6, wherein the file system is further configured to:
modify the first replication policy associated with the first block to obtain a second replication policy, wherein the second replication policy specifies a third replication type.

8. The system of claim 7, wherein the file system is further configured to:
receive a second write operation to write a modified version of the first block to the storage pool;
determine the third replication type for the modified version of first block using the second replication policy associated with the first block;
determine a third number of physical blocks required to write the modified version of the first block to the storage pool using a size of the modified version of the first block and the third replication type; and
write the modified version of the first block, in accordance with the second replication policy, to the storage pool by filling in the third number of physical blocks.

9. The system of claim 7, wherein the file system is further configured to:
receive a second write operation to write a second block to the storage pool;
determine the third replication type for the second block using the second replication policy, wherein the second block is associated with the second replication policy;
determine a third number of physical blocks required to write the second block to the storage pool using a size of the second block and the third replication type; and
write the second block, in accordance with the second replication policy, to the storage pool by filling in the third number of physical blocks.

10. The system of claim 7, wherein the file system is further configured to:
initiate a background process in response to modifying the first replication policy, wherein
the background process is configured to:
obtain the first block from the storage pool, and
re-write the first block to the storage pool using the second replication policy.

11. The system of claim 6, wherein the first replication policy corresponds to one selected from the group consisting of: a block level replication policy, a file level replication policy, and a file system replication policy.

12. A computer readable medium comprising computer readable program code embodied therein for causing a computer system to:
determine a first replication type for the first block using a first replication policy associated with the first block, wherein the first block is a data block;
determine a first number of physical blocks required to write the first block to the storage pool using a size of the first block and the first replication type;
write the first block, in accordance with the first replication policy, to the storage pool by filling in the first number of physical blocks,
wherein the storage pool is organized in a hierarchical tree structure comprising data blocks and indirect blocks located hierarchically above the data blocks, and
wherein the first replication type for the first data block is stored in a block pointer of a first indirect block referencing the first data block in the hierarchical tree structure;

determining a second replication type for the first indirect block using the first replication policy associated with the first indirect block;

determining a second number of physical blocks required to write the first indirect block using a size of the first indirect block and the second replication type; and writing the first indirect block, in accordance with the first replication policy by filling in the second number of physical blocks in the storage pool, wherein the second replication type and the size of the first indirect block is stored in a block pointer of a second indirect block referencing the first indirect block.

13. The computer readable medium of claim 12, further comprising computer readable program code embodied therein for causing the computer system to:

modify the first replication policy associated with the first block to obtain a second replication policy, wherein the second replication policy specifies a third replication type.

14. The computer readable medium of claim 13, further comprising computer readable program code embodied therein for causing the computer system to:

receive a second write operation to write a modified version of the first block to the storage pool;

determine the third replication type for the modified version of first block using the second replication policy associated with the first block;

determine a third number of physical blocks required to write the modified version of the first block to the storage pool using a size of the modified version of the first block and the third replication type; and write the modified version of the first block, in accordance with the second replication policy, to the storage pool by filling in the third number of physical blocks.

15. The computer readable medium of claim 13, further comprising computer readable program code embodied therein for causing the computer system to:

receive a second write operation to write a second block to the storage pool;

determine the third replication type for the second block using the second replication policy, wherein the second block is associated with the second replication policy;

determine a third number of physical blocks required to write the second block to the storage pool using a size of the second block and the third replication type; and write the second block, in accordance with the second replication policy, to the storage pool by filling in the third number of physical blocks.

16. The computer readable medium of claim 13, further comprising computer readable program code embodied therein for causing the computer system to:

initiate a background process in response to modifying the first replication policy, wherein the background process is configured to:

obtain the first block from the storage pool, and re-write the first block to the storage pool using the second replication policy.

17. The computer readable medium of claim 12, wherein the first replication policy corresponds to one selected from the group consisting of: a block level replication policy, a file level replication policy, and a file system replication policy.

18. The method of claim 1, wherein the first number of physical blocks required to write the first data block to the storage pool is a multiple of the maximum supported replication level of a file system associated with the storage pool.

19. The system of claim 6, wherein the first number of physical blocks required to write the first data block to the storage pool is a multiple of the maximum supported replication level of the file system.

* * * * *